(12) United States Patent
Nishioka et al.

(10) Patent No.: US 11,084,915 B2
(45) Date of Patent: Aug. 10, 2021

(54) COMPOSITION FOR RESIN SURFACE ROUGHENING

(71) Applicants: SUMITOMO SEIKA CHEMICALS CO., LTD., Hyogo (JP); OSAKA RESEARCH INSTITUTE OF INDUSTRIAL SCIENCE AND TECHNOLOGY, Izumi (JP)

(72) Inventors: Kiyoshi Nishioka, Himeji (JP); Hiroki Maeda, Himeji (JP); Kei Ishikura, Osaka (JP); Kimihiro Matsukawa, Osaka (JP); Yukiyasu Kashiwagi, Osaka (JP); Masashi Saitoh, Osaka (JP)

(73) Assignees: Sumitomo Seika Chemicals Co., Ltd., Hyogo (JP); Osaka Research Institute of Industrial Science and Technology, Osaka (JP)

( * ) Notice: Subject to any disclaimer, the term of this patent is extended or adjusted under 35 U.S.C. 154(b) by 308 days.

(21) Appl. No.: 16/062,741

(22) PCT Filed: Dec. 26, 2016

(86) PCT No.: PCT/JP2016/088652
§ 371 (c)(1),
(2) Date: Jun. 15, 2018

(87) PCT Pub. No.: WO2017/119330
PCT Pub. Date: Jul. 13, 2017

(65) Prior Publication Data
US 2018/0371197 A1    Dec. 27, 2018

(30) Foreign Application Priority Data

Jan. 4, 2016    (JP) .............................. JP2016-000163

(51) Int. Cl.
| | |
|---|---|
| *B29C 71/02* | (2006.01) |
| *C08K 3/22* | (2006.01) |
| *C08K 3/26* | (2006.01) |
| *C08K 5/098* | (2006.01) |
| *C08L 69/00* | (2006.01) |
| *C08J 7/00* | (2006.01) |
| *C08L 63/00* | (2006.01) |
| *C08G 59/42* | (2006.01) |
| *C08G 64/34* | (2006.01) |

(52) U.S. Cl.
CPC ............ *C08J 7/08* (2013.01); *C08G 59/4215* (2013.01); *C08G 64/34* (2013.01); *C08J 7/00* (2013.01); *C08K 3/22* (2013.01); *C08K 3/26* (2013.01); *C08K 5/098* (2013.01); *C08L 63/00* (2013.01); *C08L 69/00* (2013.01); *C08J 2369/00* (2013.01); *C08K 2003/2203* (2013.01); *C08K 2003/262* (2013.01)

(58) Field of Classification Search
USPC .......................... 528/196, 198, 272, 273, 274
See application file for complete search history.

(56) References Cited

U.S. PATENT DOCUMENTS

| | | | |
|---|---|---|---|
| 5,135,773 | A | 8/1992 | Suzuki |
| 2009/0170969 | A1 | 7/2009 | Ogasawara |
| 2012/0123066 | A1 | 5/2012 | Fujimoto et al. |
| 2016/0185696 | A1 | 6/2016 | Nakamatsu Kuniyoshi et al. |
| 2016/0304717 | A1 | 10/2016 | Onizawa |

FOREIGN PATENT DOCUMENTS

| | | | |
|---|---|---|---|
| CN | 1042167 | A | 5/1990 |
| CN | 1926179 | A | 3/2007 |
| CN | 101166705 | A | 4/2008 |
| CN | 102933656 | A | 2/2013 |
| CN | 103360709 | A | 10/2013 |
| CN | 104761878 | A | 7/2015 |
| JP | H05-001217 | A | 1/1993 |
| JP | 2000-355690 | A | 12/2000 |
| JP | 2001-146591 | A | 5/2001 |
| JP | 2002-121321 | A | 4/2002 |
| JP | 2004-035830 | A | 2/2004 |
| JP | 2004-205990 | A | 7/2004 |
| JP | 2004-207475 | A | 7/2004 |
| JP | 2005-116745 | A | 4/2005 |
| JP | 2005-146234 | A | 6/2005 |
| JP | 2005-281348 | A | 10/2005 |
| JP | 2006-169475 | A | 6/2006 |
| JP | 4558435 | B2 | 10/2010 |
| JP | 2010-274158 | A | 12/2010 |
| JP | 2011-162783 | A | 8/2011 |
| JP | 2011162783 | A * | 8/2011 ............... C08J 7/08 |

(Continued)

OTHER PUBLICATIONS

Machine translation of JPH051217A, no date.*
Ono, Hironobu et al. Flame-Retardant Resin Composition and Method for Producing the Same (Translation) (Year: 2011).*
Office Action dated Oct. 24, 2019, from the China National Intellectual Property Administration in counterpart Chinese Application No. 201680077897.5.
Extended European Search Report dated Aug. 13, 2019 from the European Patent Office in corresponding EP Application No. 16883829.0.
Plastic mold processing manual, 1995, No. 1, p. 36 (2 pages total).
Office Action dated Aug. 4, 2020 from The State Intellectual Property Office of the P.R. of China in Chinese Application No. 201680077897.5.
International Search Report of PCT/JP2016/088652 dated Mar. 28, 2017 [PCT/ISA/210].

*Primary Examiner* — Terressa Boykin
(74) *Attorney, Agent, or Firm* — Sughrue Mion, PLLC (57) ABSTRACT

Provided is a means capable of realizing a surface-roughening method for modifying the surface of a resin molded article to form a surficial layer, such as a coating or plating, or to impart a function derived from the surface configuration. The method comprises adding a resin composition and performing a post-treatment and is thus simpler and easier than conventional methods. The resin composition is a composition for resin surface roughening that contains an aliphatic polycarbonate and an alkali metal salt.

7 Claims, 2 Drawing Sheets

(56) References Cited

FOREIGN PATENT DOCUMENTS

| | | |
|---|---|---|
| JP | 2014-055232 A | 3/2014 |
| JP | 2015-174865 A | 10/2015 |
| TW | 201041934 A1 | 12/2010 |
| TW | 201538632 A | 10/2015 |
| WO | 00/09582 A1 | 2/2000 |
| WO | 2005/082983 A1 | 9/2005 |
| WO | 2014/185793 A1 | 11/2014 |

* cited by examiner

Example 14

Comparative Example 8

Comparative Example 9

COMPOSITION FOR RESIN SURFACE ROUGHENING

CROSS REFERENCE TO RELATED APPLICATIONS

This application is a National Stage of International Application No. PCT/JP2016/088652, filed Dec. 26, 2016, claiming priority based on Japanese Patent Application No. 2016-000163, filed Jan. 4, 2016.

TECHNICAL FIELD

The present invention relates to a composition for resin surface roughening. The present invention further relates to a method for roughening a resin surface using the composition for resin surface roughening; a surface-roughened resin molded article produced using the composition for resin surface roughening; and a method for producing a surface-roughened resin molded article using the composition for resin surface roughening.

BACKGROUND ART

In recent years, various resins have been developed and physical properties of resins are being improved. In addition to the improvement of the resin itself, attempts have been made to impart functions to resin molded articles by physically and chemically modifying the resin surface layer. For example, Patent Literature (PTL) 1 discloses a film having an anti-reflection function imparted by forming a fine rugged pattern on a resin surface layer by imprinting. PTL 2 discloses a film hydrophilized by an atmospheric pressure plasma treatment. Further, functions are imparted by using a modified resin surface layer as a base and plating the layer with a metal or applying an organic substance to the layer. For example, PLT 3 discloses a conductor-coating film produced by mechanically roughening a resin surface with a sandblast, dipping it in a silane coupling agent, and then performing electroless plating. PLT 4 discloses that adhesion and coatability can be improved by applying an oxygen plasma to a resin surface and then adhering water molecules in the air to the resin surface.

CITATION LIST

Patent Literature

PTL 1: JP2004-205990A
PTL 2: JP2006-169475A
PTL 3: JP2005-116745A
PTL 4: JP2010-274158A

SUMMARY OF INVENTION

Technical Problem

Aliphatic polycarbonates are known to easily decompose in response to various stimuli. For example, aliphatic polycarbonates, in contact with an aqueous alkaline solution or upon heating at about 250° C., easily decompose. By utilizing this property, the resin surface can be expected to be roughened by removing only an aliphatic polycarbonate from the resin surface of a molded article obtained using a resin composition comprising an aliphatic polycarbonate. However, for example, when heating is performed to remove only an aliphatic polycarbonate, the following problem arises. Common thermoplastic resins have a softening temperature of less than 200° C. Therefore, when an aliphatic polycarbonate is thermally decomposed, a thermoplastic resin is also softened, so that the shape of a molded article comprising the thermoplastic resin cannot be maintained.

An attempt has been made to lower the thermal decomposition temperature of an aliphatic polycarbonate by adding a salt containing an organic onium cation to the aliphatic polycarbonate. However, among the additives disclosed, only limited types of additives can lower the initial thermal decomposition temperature to less than 200° C. Such additives are industrially difficult to obtain and highly expensive.

An object of the present invention is to provide a method for roughening a resin surface by removing only an aliphatic polycarbonate from the resin surface of a resin composition comprising the aliphatic polycarbonate by simpler and easier means.

Solution to Problem

To solve the above problem, the present inventors conducted extensive research. As a result, the inventors found that a composition for resin surface roughening can be obtained by adding an alkali metal compound to an aliphatic polycarbonate. The inventors conducted further research based on this finding and have accomplished the present invention.

Specifically, the present invention includes, for example, the subject matter described in the following items.

Item 1. A composition for resin surface roughening comprising an aliphatic polycarbonate and an alkali metal compound.

Item 2. The composition for resin surface roughening according to Item 1, wherein the alkali metal compound is at least one member selected from the group consisting of alkali metal hydroxides and alkali metal salts.

Item 3. The composition for resin surface roughening according to Item 2, wherein the alkali metal salt is at least one member selected from the group consisting of alkali metal carbonates and alkali metal acetates.

Item 4. The composition for resin surface roughening according to any one of Items 1 to 3, which contains the alkali metal compound in an amount of 10 ppm or more and 5000 ppm or less, relative to the aliphatic polycarbonate.

Item 5. The composition for resin surface roughening according to any one of Items 1 to 4, wherein the aliphatic polycarbonate is an alternating copolymer of an epoxide and carbon dioxide.

Item 6. A resin composition comprising the composition for resin surface roughening according to any one of Items 1 to 5 and a base resin.

Item 7. A method for producing a resin molded article having a surface-roughened surface layer, comprising decomposing the aliphatic polycarbonate contained in a molded article of the resin composition according to Item 6.

Item 8. A method for producing a resin molded article having a surface-roughened surface layer, comprising heating a molded article of the resin composition according to Item 6.

Advantageous Effects of Invention

The composition for resin surface roughening of the present invention comprises an aliphatic polycarbonate and an alkali metal compound. The aliphatic polycarbonate in contact with an alkali metal compound, which would usually decompose immediately in that state, does not decompose and can be stored over a long period of time. Furthermore, the thermal decomposition temperature can be significantly reduced. Therefore, the aliphatic polycarbonate resin can be thermally decomposed at a temperature at which a base resin is not affected by heat.

Thus, according to the present invention, the surface of various resins can be roughened merely by heating, and functions can be imparted to a resin molded article merely by a simple and easy operation.

DESCRIPTION OF EMBODIMENTS

The composition for resin surface roughening of the present invention contains an aliphatic polycarbonate and an alkali metal compound.

Examples of aliphatic polycarbonates include, but are not limited to, aliphatic polycarbonates obtained by alternating copolymerization of an epoxide and carbon dioxide, aliphatic polycarbonates obtained by polycondensation of a diol and a carbonic acid ester, and aliphatic polycarbonates obtained by ring opening polymerization of a cyclic carbonate. From the viewpoint of the ease of polymerization reaction, aliphatic polycarbonates obtained by alternating copolymerization of an epoxide and carbon dioxide are preferably used. The aliphatic polycarbonates obtained by alternating copolymerization of an epoxide and carbon dioxide refer to aliphatic polycarbonates having a structure in which an epoxide and carbon dioxide are alternatively polymerized as monomer structural units. The aliphatic polycarbonates have a structure obtained by polycondensation of a diol and a carbonic acid ester refer to aliphatic polycarbonates having a diol and a carbonic acid ester as monomer structural units. The aliphatic polycarbonates obtained by ring opening polymerization of a cyclic carbonate refer to aliphatic polycarbonates having a cyclic carbonate as monomer structural unit.

The epoxide is not particularly limited as long as it is an epoxide that can undergo a polymerization reaction with carbon dioxide to form an aliphatic polycarbonate having a structure in which an aliphatic group is present on the main chain. Examples include ethylene oxide, propylene oxide, 1-butene oxide, 2-butene oxide, isobutylene oxide, 1-pentene oxide, 2-pentene oxide, 1-hexene oxide, 1-octene oxide, 1-decene oxide, cyclopentene oxide, cyclohexene oxide, styrene oxide, vinylcyclohexene oxide, 3-phenylpropylene oxide, 3,3,3-trifluoropropylene oxide, 3-naphthylpropylene oxide, 3-phenoxypropylene oxide, 3-naphthoxypropylene oxide, butadiene monoxide, 3-vinyloxypropylene oxide, 3-trimethylsilyloxypropylene oxide, and the like. Of these epoxides, from the viewpoint of having a high polymerization reactivity with carbon dioxide, ethylene oxide and propylene oxide are preferable. These epoxides can be used singly or in a combination of two or more.

Specific examples of preferable aliphatic polycarbonates include polypropylene carbonate, polyethylene carbonate, polycyclohexene carbonate, and the like.

The lower limit of the mass average molecular weight of the aliphatic polycarbonate is preferably 5000, more preferably 10000, and particularly preferably 100000. The upper limit is preferably 1000000, more preferably 750000, and particularly preferably 500000. That is, the aliphatic polycarbonate preferably has a mass average molecular weight in the range of 5000 to 1000000. When the aliphatic polycarbonate has a mass average molecular weight of less than 5000, the viscosity of the resin is excessively low, and uniformly mixing the aliphatic polycarbonate with a base resin may be difficult. When the aliphatic polycarbonate has a mass average molecular weight of more than 1000000, the aliphatic polycarbonate and base resin may be less compatible with each other and an appropriately dispersed state may not be achieved. The mass average molecular weight is a value determined in a 30 mmol N,N-dimethylformamide lithium bromide solution at 40° C. by gel permeation chromatography (Waters 2695 separation module, produced by Nihon Waters K.K.) and calculated (on a standard polystyrene basis).

Aliphatic polycarbonates can be used singly or in a combination of two or more.

The method for producing an aliphatic polycarbonate includes, for example, a method comprising subjecting the epoxide and carbon dioxide to a polymerization reaction in the presence of a metal catalyst.

The metal catalyst includes, for example, zinc-based catalysts, aluminum-based catalysts, chromium-based catalysts, cobalt-based catalysts, and the like. Among them, zinc-based catalysts and cobalt-based catalysts are preferable because of having high polymerization activities in the polymerization reaction of an epoxide and carbon dioxide. Zinc-based catalysts, in particular, organozinc-based catalysts are preferably used in view of obtaining a high-molecular-weight product.

The organozinc-based catalyst includes, for example, organozinc catalysts, such as zinc acetate, diethyl zinc, and dibutyl zinc; organozinc catalysts obtained by reacting a zinc compound with a compound, such as a primary amine, a dihydric phenol, a dihydric aromatic carboxylic acid, an aromatic hydroxy acid, an aliphatic dicarboxylic acid, or an aliphatic monocarboxylic acid; and the like. Among these organozinc catalysts, because of having higher polymerization activities, organozinc catalysts obtained by reacting a zinc compound, an aliphatic dicarboxylic acid, and an aliphatic monocarboxylic acid are preferable, and organozinc catalysts obtained by reacting zinc oxide, glutaric acid, and acetic acid are more preferable.

The amount of the metal catalyst used in the polymerization reaction is such that the lower limit of the amount of the metal catalyst is preferably 0.0001 moles, and more preferably 0.001 moles, per mole of epoxide, and the upper limit thereof is preferably 0.2 moles, and more preferably 0.05 moles, per mole of epoxide. When the amount of the metal catalyst used is less than 0.0001 moles, the polymerization reaction may not proceed smoothly. When the amount of the metal catalyst used is more than 0.2 moles, effects commensurate with the amount used may not be obtained and thus may be uneconomical.

The reaction solvent optionally used in the polymerization reaction is not particularly limited. Various organic solvents can be used.

Examples of organic solvents include aliphatic hydrocarbon solvents, such as pentane, hexane, octane, decane, and cyclohexane; aromatic hydrocarbon solvents, such as benzene, toluene, and xylene; halogenated hydrocarbon solvents, such as methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, and bromobenzene; ether solvents, such as dimethoxyethane, tetrahydrofuran, 2-methyltetrahydrofuran, 1,4-dioxane, and 1,3-dioxolane; ester solvents, such as ethyl acetate, n-propyl acetate, and isopropyl acetate; amide solvents, such as N,N-dimethylformamide and N,N-dimethylacetamide; carbonate solvents, such as dimethyl carbonate, ethylmethyl carbonate, diethyl carbonate, and propylene carbonate; and the like.

From the viewpoint of achieving a smooth reaction, the amount of the reaction solvent used is preferably 100 to 10000 parts by mass per 100 parts by mass of epoxide.

In the polymerization reaction, the method of reacting an epoxide and carbon dioxide in the presence of a metal catalyst is not particularly limited. For example, the following method can be used. After an epoxide and catalyst are placed optionally with a reaction solvent in an autoclave and mixed, carbon dioxide is compressed into the autoclave and a reaction is allowed to proceed.

The pressure of carbon dioxide used in the polymerization reaction is not particularly limited. The lower limit of the pressure is preferably 0.1 MPa, more preferably 0.2 MPa, and particularly preferably 0.5 MPa. The upper limit of the pressure is preferably 20 MPa, more preferably 10 MPa, and particularly preferably 5 MPa. When the pressure of the carbon dioxide used is lower than 0.1 MPa, the polymerization may not proceed. When the pressure of the carbon dioxide used is more than 20 MPa, effects commensurate with the pressure used may not be obtained and thus may be uneconomical.

The polymerization reaction temperature in the polymerization reaction is not particularly limited. The lower limit of the polymerization reaction temperature is preferably 0° C., more preferably 20° C., particularly preferably 30° C. The upper limit is preferably 100° C., more preferably 95° C., even more preferably 90° C., still even more preferably 80° C., and particularly preferably 60° C. When the polymerization reaction temperature is less than 0° C., the polymerization reaction may take a long time. When the polymerization reaction temperature is higher than 100° C., a side reaction may occur and lead to a lower yield.

The polymerization reaction time cannot be generalized because it depends on the polymerization reaction conditions. It is usually preferable that the polymerization reaction time be 1 to 40 hours.

Examples of the alkali metal compound used in the present invention include alkali metal salts (such as alkali metal carbonates, alkali metal carboxylates, and alkali metal inorganic acid salts), alkali metal hydroxides, alkali metal hydrides, alkali metal amides, alkali metal alkoxides, alkali metal phenoxides, alkali metal alkyls, and the like. Alkali metal salts and alkali metal hydroxides are preferable. Examples of alkali metal compounds include lithium compounds, sodium compounds, potassium compounds, rubidium compounds, cesium compounds, and the like.

Examples of alkali metal carbonates include sodium carbonate, potassium carbonate, cesium carbonate, and the like. Examples of alkali metal carboxylates include alkali metal acetates. Specific examples include sodium acetate, potassium acetate, cesium acetate, and the like. Examples of alkali metal inorganic acid salts include sodium chloride, potassium chloride, sodium phosphate, potassium phosphate, sodium nitrate, potassium nitrate, sodium borate, and the like. Examples of alkali metal hydroxide include lithium hydroxide, sodium hydroxide, potassium hydroxide, cesium hydroxide, and the like. Examples of alkali metal hydride include lithium hydride, sodium hydride, potassium hydride, and the like. Examples of alkali metal amides include sodium amide, potassium amide, lithium diisopropylamide, sodium bis(trimethylsilyl)amide, potassium hexamethyldisilazide, and the like. Examples of alkali metal alkoxides include sodium methoxide, potassium methoxide, potassium tert-butoxide, and the like. Examples of alkali metal phenoxides include lithium phenoxide, sodium phenoxide, potassium phenoxide, and the like. Examples of alkali metal alkyls include methyllithium, butyl lithium, and the like. Among these, from the viewpoint of ease of availability and high effect of reducing the decomposition temperature, alkali metal carbonates, alkali metal carboxylates, and alkali metal hydroxides are preferable.

Such alkali metal compounds can be used singly or in a combination of two or more. The aliphatic polycarbonate and alkali metal compound can be used in a suitable combination. That is, the desired one or more aliphatic polycarbonates and one or more alkali metal compounds can be appropriately used in combination.

The lower limit of the alkali metal compound content is preferably 10 ppm, more preferably 30 ppm, still more preferably 40 ppm, and particularly preferably 50 ppm, relative to aliphatic polycarbonate. The upper limit of the alkali metal compound content is preferably 5000 ppm, more preferably 3000 ppm, still more preferably 2500 ppm, and particularly preferably 2000 ppm, relative to aliphatic polycarbonate. If the alkali metal compound content is within this range (10 to 5000 ppm), a sufficient effect of reduction in the thermal decomposition initiation temperature can be achieved while the storage stability of the composition for resin surface roughening is maintained. The ppm figures here are based on the mass ratio.

The alkali metal compound can be added, for example, in the form of a solid, an aqueous solution, or a solution in an organic solvent, a suspension in an organic solvent so as to be in a dispersed state, etc. From the viewpoint of uniformly mixing an alkali metal compound with an aliphatic polycarbonate, the alkali metal compound is preferably used in the form of an aqueous solution or a solution in an organic solvent. That is, an aqueous solution of an alkali metal compound or a solution of an alkali metal compound in an organic solvent is preferably mixed with an aliphatic polycarbonate. The organic solvent used to form a solution in an organic solvent is preferably a solvent that is miscible with a solvent capable of dissolving an aliphatic polycarbonate described below. The method for mixing an aliphatic polycarbonate and an alkali metal compound includes, for example, a method comprising once dissolving an aliphatic polycarbonate and an alkali metal compound in a solvent and then removing the solvent; melt-kneading methods using a roller, extruder, Banbury mixer, Plastomill, Brabender, or the like. From the viewpoint of mixing without decomposing aliphatic polycarbonate, a method comprising dissolving these components in a solvent and mixing is preferable.

The solvent used for mixing is not particularly limited as long as it can dissolve aliphatic polycarbonate. Examples include ketone solvents, such as acetone and methyl ethyl ketone; halogenated hydrocarbon solvents, such as methylene chloride and chloroform; ether solvents, such as dimethoxyethane, tetrahydrofuran, and 1,4-dioxane; ester solvents, such as methyl acetate and ethyl acetate; amide solvents, such as N,N-dimethylformamide and N,N-dimethylacetamide; carbonate solvents, such as dimethyl carbonate and propylene carbonate; and the like.

The composition for resin surface roughening containing an aliphatic polycarbonate and an alkyl metal compound may contain additives other than the aliphatic polycarbonate and the alkali metal compound.

Examples of usable additives include flavoring agents, colorants, pigments, antifungal agents, antimicrobial agents, antioxidants, ultraviolet absorbers, antistatic agents, and the like. These additives remain in a base resin and exhibit their effects even after an aliphatic polycarbonate has been lost by the heat-treatment of a molded article described later.

When one or more additives are used, the amount of the additives is preferably 0.1 parts by mass to 10 parts by mass per 100 parts by mass of the aliphatic polycarbonate.

The composition obtained by mixing in this manner can be used as the composition for resin surface roughening. When the composition obtained by mixing contains a solvent, a composition obtained by further removing the solvent can be preferably used as a composition for resin surface roughening.

The present invention also provides a resin composition comprising the composition for resin surface roughening and a base resin.

Examples of the base resin include polyolefin resins, such as polyethylene and polypropylene; (meth)acrylic resins, such as polymethyl (meth)acrylate and polybutyl (meth)acrylate; polystyrene; polyester resins, such as polyethylene terephthalate, polybutylene terephthalate, and polylactic acid; polyamide resins, such as 6-nylon and 6,6-nylon; polycarbonate resins, such as polybisphenol A carbonate; fluororesins, such as polytetrafluoroethylene; polyacetal resins; polyether resins, such as polyethylene oxide, polypropylene oxide, and polyphenylene oxide; cellulose resins, such as cellulose triacetate and ethyl cellulose; vinyl resins, such as polyvinyl chloride, polyvinyl acetate, and polybutadiene; polyimide resins, silicone resins, phenolic resins, epoxy resins, urea resins, melamine resins, unsaturated polyester resins, alkyd resins, urethane resins, and the like. Among these, resins or thermosetting (photo-curable) resins having a softening temperature of 160° C. or more, which are less likely to be influenced by heat at the decomposition temperature of aliphatic polycarbonate, are preferable.

The method for producing the resin composition comprising a composition for resin surface roughening and a base resin may vary depending on the type of base resin used. For example, a method comprising dissolving and mixing a composition for resin surface roughening and a base resin in a solvent and then removing the solvent; a method comprising dissolving a composition for resin surface roughening in a base resin monomer and then subjecting the base resin to a polymerization reaction; a method comprising applying a solution containing the composition for resin surface roughening to the surface of a base resin; a method comprising melt-kneading a composition for resin surface roughening and a base resin using a roller, extruder, Banbury mixer, Plastomill, Brabender, or the like.

The amount of the resin composition for surface roughening used is preferably, on a dry mass basis, 1 part by mass to 20 parts by mass, more preferably 5 parts by mass to 10 parts by mass, per 100 parts by mass of the base resin. When the composition for resin surface roughening is used in this range, the surface can be roughened without damaging the original physical properties of the base resin.

When the resin composition comprising the composition for resin surface roughening and a base resin is produced, one or more other additives may be added. Examples of additives include antioxidants, ultraviolet absorbers, light stabilizers, flame retardants, antistatic agents, antimicrobial agents, nucleating agents, lubricants, anti-blocking agents, colorants, fillers, photosensitizers, photopolymerization initiators, curing accelerators, curing catalysts, and the like.

The amount of the additive(s) is preferably 0.1 parts by mass to 20 parts by mass, and more preferably 1 part by mass to 10 parts by mass, based on 100 parts by mass of the base resin. When the amount of additive used is within this range, the additives can exert their functions without damaging the original physical properties of the base resin.

The present invention further provides a resin surface-roughening method comprising decomposing aliphatic polycarbonate contained in a resin composition comprising the composition for resin surface roughening and a base resin (preferably a molded article of the composition). Further, the present invention provides a resin surface-roughening method comprising molding a resin composition comprising the composition for resin surface roughening and a base resin and decomposing aliphatic polycarbonate in the composition for resin surface roughening.

Further, the present invention provides a method for producing a resin molded article having a surface-roughened surface layer, comprising decomposing aliphatic polycarbonate contained in a molded article of a resin composition comprising the composition for resin surface roughening and a base resin. Further, the present invention provides a method for producing a resin molded article having a surface-roughened surface layer, comprising heating a molded article of a resin composition comprising the composition for resin surface roughening and a base resin.

The surface of a molded article produced by molding a resin composition comprising the composition for resin surface roughening and a base resin can be easily roughened because the aliphatic polycarbonate contained therein is decomposed by heating. Furthermore, the aliphatic polycarbonate has a decomposition initiation temperature lower than that of the prior art and is thus preferable. The aliphatic polycarbonate is preferably decomposed by heating, for example, at 200° C. or less, or 195° C. or less. The lower limit of the heating temperature is not particularly limited as long as the aliphatic polycarbonate contained can decompose at that temperature. The lower limit of the temperature may be, for example, about 80° C. or more, about 90° C. or more, about 100° C. or more, about 110° C. or more, about 120° C. or more, about 130° C. or more, about 140° C. or more, and about 150° C. or more.

The shape of the molded article is not particularly limited. The molded article may be in any shape, such as a stranded, film, sheet, planar, pellet, or fibrous shape.

The molding method in the molding step is not particularly limited. Examples include injection molding, compression molding, injection compression molding, gas injection molding, foam injection molding, inflation molding, T-die molding, calendar molding, blow molding, vacuum molding, compressed air molding, rotational molding, FRP molding, lamination molding, melt flow molding, melt casting, transfer molding, pre-preg lamination press molding, pre-preg autoclave molding, matched-die molding, hand lay-up molding, SMC (sheet molding compound) press molding, BMC (bulk molding compound) molding, resin infusion molding, filament winding molding, pultrusion molding, pin winding molding, and the like.

When the molded article of the present invention is in the form of a film or sheet, a multi-layered film or sheet can be formed by forming a film as at least one layer of a multi-layered structure with different resins by inflation molding, T-die molding, or calendaring molding, or forming a film by extrusion lamination, thermal lamination, dry lamination, or the like. The obtained film or sheet can be mono- or biaxially stretched by roll stretching, tenter stretching, tubular stretching, or the like and used.

The surface of the molded article can be roughened by decomposing an aliphatic polycarbonate in the composition for resin surface roughening as described above.

The method of decomposing an aliphatic polycarbonate is preferably thermal decomposition by heating. Examples of heating methods include, but are not limited to hot blast heating, resistance heating, infrared heating, microwave heating, dielectric heating, induction heating, arc heating, electron beam heating, plasma heating, laser heating, and the like.

EXAMPLES

The present invention is described below in more detail with reference to Production Examples and Examples. However, the present invention is not limited to these Examples.

The mass average molecular weight (Mw) and the molecular weight distribution (Mw/Mn) of the polycarbonates obtained in the Production Examples were determined by the following methods.

The mass average molecular weight (Mw) and the molecular weight distribution (Mw/Mn) were determined in 30 mmol of a N,N-dimethylformamide lithium bromide solution at 40° C. by gel permeation chromatography (Waters 2695 Separations Modules, produced by Nihon Waters K.K.) and calculated on a standard polystyrene basis. Thermal decomposition behaviors of the polycarbonate-containing resins obtained in the Examples etc. were determined while raising the temperature from room temperature to 300° C. at a heating rate of 10° C./min in an ambient atmosphere using a TG/DTA7220 produced by SII Nano-Technology Inc. The initial thermal decomposition temperature is defined as an intersection of a line drawn parallel to the abscissas axis in such a manner as to pass through the mass before starting the test heating and a tangent line drawn so that the slope between the inflection points of the decomposition curve is at its maximum.

Production Example 1: Production of Organozinc Catalyst 38.6 g (0.5 mol) of zinc oxide, 61.5 g (0.5 mol) of glutaric acid, 0.57 g (0.01 mol) of acetic acid, and 350 g of toluene were placed in a 500-mL four-necked flask equipped with a stirrer, a nitrogen gas inlet tube, a thermometer, a Dean-Stark tube, and a reflux condenser. Subsequently, while nitrogen was introduced into the reaction system at a flow rate of 100 mL/min, the temperature was raised to 55° C. and stirring was performed at the same temperature for 4 hours to allow a reaction to proceed. After the temperature was then raised to 110° C., the mixture was further stirred at the same temperature for 2 hours for azeotropic removal of water. After the water removal, the resulting mixture was cooled to room temperature to obtain a slurry containing an organozinc catalyst.

Production Example 2: Production of Polypropylene Carbonate

After a 1-L autoclave equipped with a stirrer, a gas inlet tube, and a thermometer was purged with a nitrogen atmosphere beforehand, 117.3 g of a slurry containing an organozinc catalyst (containing 135 mmol of an organozinc catalyst) obtained in Production Example 1, 500 g of dimethyl carbonate, and 78.3 g (1.35 mmol) of propylene oxide were placed in the autoclave. Subsequently, while stirring, carbon dioxide was added until the pressure in the reaction system had reached 1 MPa. The temperature was then raised to 60° C., and a polymerization reaction was allowed to proceed for 8 hours while carbon dioxide consumed by the reaction was replenished. After completion of the reaction, the autoclave was cooled and depressurized, and the reaction mixture was then filtered and dried under reduced pressure to obtain 120 g of polypropylene carbonate. The obtained polypropylene carbonate had a mass average molecular weight of 236000 (Mw/Mn=10.0).

Production Example 3: Production of Polyethylene Carbonate 95.0 g of polyethylene carbonate was obtained in the same manner as in Production Example 2 except that 59.4 g (1.35 mol) of ethylene oxide was used in place of 78.3 g (1.35 mol) of propylene oxide. The obtained polyethylene carbonate had a mass average molecular weight of 197000 (Mw/Mn=3.60).

Production Example 4: Production of Polycyclohexene Carbonate 65.3 g of polycyclohexene carbonate was obtained in the same manner as in Production Example 2 except that 120 g (1.35 mol) of cyclohexane oxide was used in place of 78.3 g (1.35 mol) of propylene oxide and the reaction temperature was changed from 60° C. to 80° C. The obtained polycyclohexene carbonate had a mass average molecular weight of 274000 (Mw/Mn=7.12).

Example 1

Figure 1:
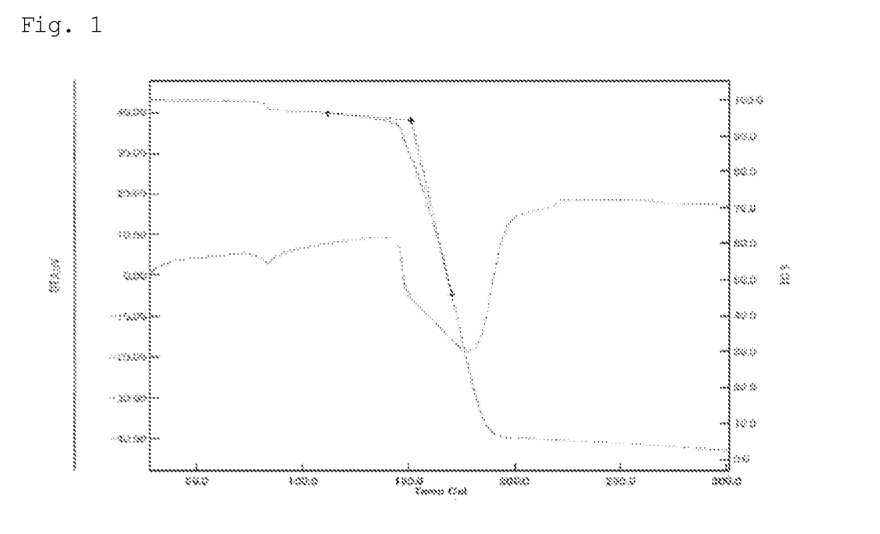
FIG. 1 is a thermal decomposition curve of the resin composition obtained in Example 1.

2.0 g of polypropylene carbonate obtained in Production Example 2 was placed in a 20-mL glass vial and 8.0 g of methyl ethyl ketone was added and dissolved to prepare a uniform solution. 40 µg of a 0.1 mol % aqueous potassium hydroxide solution (110 ppm relative to polypropylene carbonate, in terms of potassium hydroxide added) was added and stirred. The obtained solution was heated at 80° C. for 15 minutes and the solvent was removed. The thermal decomposition initiation temperature of the composition for resin surface roughening was determined. FIG. 1 shows that the thermal decomposition initiation temperature is 156° C.

The obtained composition for resin surface roughening was allowed to stand in an 80° C. oven for 24 hours and the occurrence of any decomposition was investigated. No decomposition occurred.

Examples 2 to 12

Compositions for resin surface roughening were prepared by using various kinds and amounts of additives (alkali metal compounds) and various types of aliphatic polycarbonates as shown in Table 1 and the thermal decomposition temperature of each composition was measured. Table 1 shows the results.

Comparative Examples 1 to 5

Compositions for resin surface roughening were prepared by using various kinds and amounts of additives and various types of aliphatic polycarbonates as shown in Table 1 and the thermal decomposition temperature of each composition was measured. Table 1 shows the results.

TABLE 1

| | Polycarbonate | Alkali metal compound | Form | ppm | Thermal decomposition initiation temperature (° C.) |
|---|---|---|---|---|---|
| Example 1 | PPC | KOH | Aqueous solution | 110 | 156 |
| Example 2 | PPC | LiOH | Methanol solution | 47 | 188 |
| Example 3 | PPC | NaOH | Methanol solution | 79 | 178 |
| Example 4 | PPC | KOH | Methanol solution | 110 | 151 |
| Example 5 | PPC | CsOH | Methanol solution | 294 | 145 |
| Example 6 | PPC | $Na_2CO_3$ | Aqueous solution | 2006 | 186 |
| Example 7 | PPC | $K_2CO_3$ | Aqueous solution | 267 | 161 |
| Example 8 | PPC | $Cs_2CO_3$ | Aqueous solution | 619 | 149 |
| Example 9 | PPC | NaOAc | Aqueous solution | 500 | 195 |
| Example 10 | PPC | CsOAc | Aqueous solution | 500 | 149 |
| Example 11 | PEC | KOH | Methanol solution | 110 | 131 |
| Example 12 | PCHC | KOH | Methanol solution | 110 | 270 |
| Comp. Ex. 1 | PPC | — | — | — | 243 |
| Comp. Ex. 2 | PPC | $Ba(OH)_2$ | Aqueous solution | 3300 | 249 |
| Comp. Ex. 3 | PPC | $Al(OH)_3$ | Solid | 100000 | 254 |
| Comp. Ex. 4 | PEC | — | — | — | 253 |
| Comp. Ex. 5 | PCHC | — | — | — | 300 |

In Table 1, PPC represents polypropylene carbonate, PEC represents polyethylene carbonate, and PCHC represents polycyclohexene carbonate. The form of each alkali metal compound used is shown in the "Form" column. The mass ratio of the alkali metal compound to the aliphatic polycarbonate is shown in the "ppm" column.

A comparison between Examples 1 to 10 and Comparative Example 1 in Table 1 shows that the addition of an alkali metal compound significantly reduces the decomposition initiation temperature as compared with no addition of an alkali metal compound. Further, the results of Comparative Examples 2 and 3 show that the addition of a hydroxide other than alkali metal hydroxides does not reduce the decomposition temperature. Further, focusing on the types of alkali metals, the effect of reducing the decomposition temperature increases in the ascending order of Li<Na<K<Cs. The results of Examples 11 and 12 show that similar effects can be obtained regardless of the type of aliphatic polycarbonate.

Figure 2:
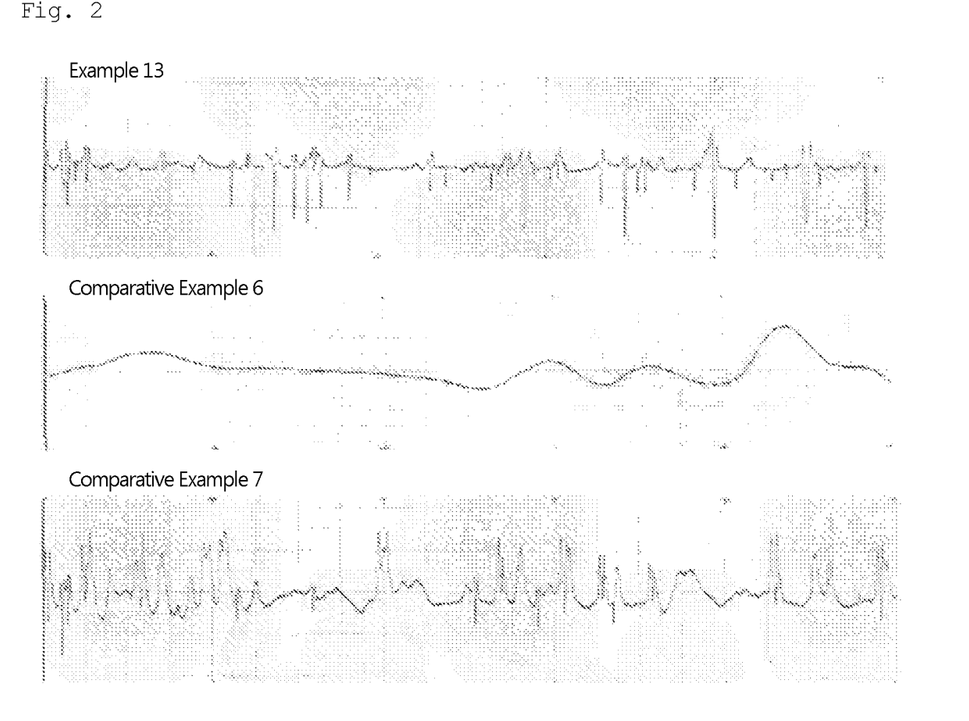
FIG. 2 shows the results of measuring the surface roughness of the resin molded articles obtained in Example 13 and Comparative Examples 6 and 7 using a surface roughness meter.

Example 13: Surface Roughening of Aromatic Polycarbonate Resin 2.0 g of aromatic polycarbonate (Panlite, produced by Teijin Ltd.) was dissolved in 18.0 g of tetrahydrofuran, and 0.2 g of the composition for resin surface roughening obtained in Example 1 was added and stirred. The obtained solution was applied to a glass substrate with a bar coater and dried at 80° C. for 30 minutes to prepare a film with a thickness of 100 μm. The obtained film was heated at 180° C. for 30 minutes within an electric furnace and then the surface was evaluated using a surface roughness meter (Surftest SJ-411, produced by Mitutoyo Corporation). FIG. 2 shows the results.

Comparative Example 6

A film was produced in the same manner as in Example 13 except that the composition for resin surface roughening obtained in Example 1 was not used. The surface roughness was evaluated. FIG. 2 shows the results.

Comparative Example 7

A film was produced in the same manner as in Example 13 except that the polypropylene carbonate obtained in Production Example 2 was used in place of the composition for resin surface roughening obtained in Example 1. The surface roughness was evaluated. FIG. 2 shows the results.

Since the aromatic polycarbonate of a base material and the composition for resin surface roughening comprising the aliphatic polycarbonate obtained in Example 1 are incompatible with each other, a film formed by molding these materials has a sea-island structure. Accordingly, if the composition for resin surface roughening containing the aliphatic polycarbonate completely decomposes, the sites occupied by the aliphatic polycarbonate become void, and many downward convex signals are observed, as is clear from the results of Example 13 (FIG. 2). In contrast, in Comparative Example 7, the surface was roughened more than that in Comparative Example 6 in which nothing was added, but many upward convex signals are observed. This result indicates that the aliphatic polycarbonate does not decompose but remains (FIG. 2).

Example 14: Surface Treatment of Epoxy Resin

Figure 3:
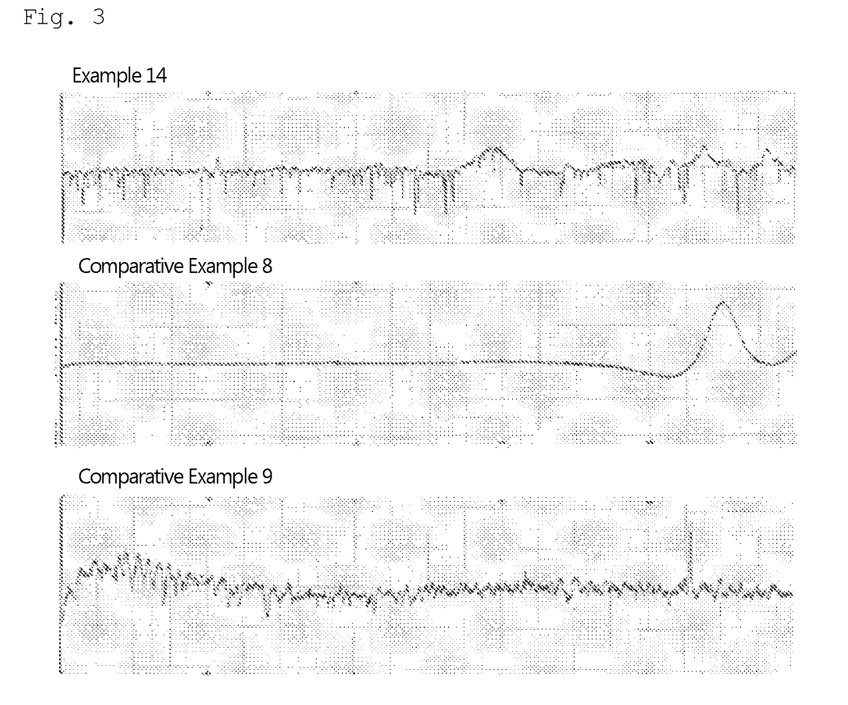
FIG. 3 is the results of measuring the surface roughness of the resin molded articles obtained in Example 14 and Comparative Examples 8 and 9.

One gram of the resin composition obtained in Example 1 was added to 6.75 g of 3',4'-epoxycyclohexylmethyl 3,4-epoxycyclohexanecarboxylate (Celloxide 2021P, produced by Daicel Corporation) and stirred. The insoluble matter was removed and 2.25 g of acid anhydrides ("Rikacid MH-700," produced by New Japan Chemical Co., Ltd.) was added. After the resulting mixture was stirred for 2 hours, 0.3 g of triphenylphosphine was added and stirred for 1 hour. After the obtained solution was applied to a glass substrate with a bar coater, heating was performed at 120° C. for 5 hours for thermal curing to form a film with a thickness of 100 μm. The obtained film was heated at 180° C. for 30 minutes and the surface was then evaluated using a surface roughness meter (Surftest SJ-411, produced by Mitutoyo Corporation). FIG. 3 shows the results.

Comparative Example 8

A film was produced in the same manner as in Example 14 except that the composition for resin surface roughening obtained in Example 1 was not added. The surface roughness was evaluated. FIG. 3 shows the results.

Comparative Example 9

A film was produced in the same manner as in Example 14 except that the polypropylene carbonate obtained in Production Example 2 was used in place of the resin composition for surface roughening obtained in Example 1. The surface roughness was evaluated. FIG. 3 shows the results.

These results show that when a composition prepared by adding an alkali metal compound to an aliphatic polycarbonate is used as a composition for resin surface roughening, the resin surface layer can be very finely roughened merely by relatively moderate heating.

INDUSTRIAL APPLICABILITY

The present invention can modify various resin surfaces merely by relatively moderate heating, enhance coating and plating efficiency, and impart functions derived from the surface configuration.

The invention claimed is:

1. A method for producing a resin molded article having a surface-roughened surface layer, comprising decomposing an aliphatic polycarbonate contained in a molded article of a resin composition, wherein the resin composition comprising the aliphatic polycarbonate, an alkali metal compound, and a base resin.

2. The method according to claim 1, wherein the alkali metal compound is at least one member selected from the group consisting of alkali metal hydroxides and alkali metal salts.

3. The method according to claim 2, wherein the alkali metal salt is at least one member selected from the group consisting of alkali metal carbonates and alkali metal acetates.

4. The method according to claim 1, which contains the alkali metal compound in an amount of 10 ppm or more and 5000 ppm or less, relative to the aliphatic polycarbonate.

5. The method according to claim 1, wherein the aliphatic polycarbonate is an alternating copolymer of an epoxide and carbon dioxide.

6. The method according to claim 3, which contains the alkali metal compound in an amount of 10 ppm or more and 5000 ppm or less, relative to the aliphatic polycarbonate.

7. The method according to claim 6, wherein the aliphatic polycarbonate is an alternating copolymer of an epoxide and carbon dioxide.

* * * * *